Patented Feb. 17, 1948

2,436,269

UNITED STATES PATENT OFFICE 2,436,269

PREPARATION OF ALPHA, OMEGA-DICARBOXYLIC ACIDS

Samuel L. Scott, Wilmington, Del., assignor to E. I. du Pont de Nemours & Company, Wilmington, Del., a corporation of Delaware No Drawing. Application August 12, 1944, Serial No. 549,291

8 Claims. (Cl. 260—537)

This invention relates to the preparation of carboxlic acids and more particularly to the preparation of alpha, omega-dicarboxylic acids.

Aliphatic alpha, omega-dicarboxylic acids are of great importance as intermediates in the preparation of many types of linear condensation polymers. Thus, for example, they may be condensed with glycols to produce long chain polyesters, with diamines to produce long chain polyamides, with amine alcohols to produce long chain polyester-amides, etc.

It is known that unusual and valuable properties may be imparted to these polymers by employing two or more such carboxylic acids in their preparation. For example, the polyamide prepared by heating a mixture of adipic and sebacic acids with hexamethylene diamine has solubility and pliability characteristics which are quite different from what might be expected from the known properties of polyhexamethylene adipamide and polyhexamethylene sebacamide. This modification in properties can be extended even further by employing more than two such dicarboxylic acids in the polymer formation.

Unfortunately, with few exceptions, the aliphatic, alpha, omega-dicarboxylic acids are not easy to prepare. Short chain acids, such as adipic, succinic, and pimelic can be made readily, and sebacic acid can be prepared from castor oil. The synthesis of the other aliphatic alpha, omega-dicarboxylic acids, however, especially those having chain lengths longer than sebacic, offers serious difficulties.

It is an object of this invention to provide a new and useful method for preparing aliphatic alpha, omega-dicarboxylic acids. A further object is to provide a simple and direct method for simultaneously oxidizing and cleaving the chain of polymers of carbon monoxide with at least one monoolefin to a mixture of carboxylic acids rich in alpha, omega-dicarboxylic acids.

The above and other objects are accomplished, according to this invention, by subjecting to oxidation, preferably in the presence of a catalyst, a polymer of carbon monoxide with at least one monoolefin. When thus oxidized, simultaneous oxidation and chain cleavage occurs to yield a mixture of carboxylic acids which is rich in alpha, omega-dicarboxylic acids.

As the oxidizing agents there can be employed nitric acid, the higher oxides of nitrogen, chromic acid, permanganates, molecular oxygen or air, or combinations of these. Of these oxidizing agents, nitric acid is preferred, specifically aqueous nitric acid containing from 25 to 70% $HNO_3$ by weight.

The temperature employed in the oxidation can be varied over a wide range, although preferably temperatures from about 50° C. up to the boiling point of the oxidizing mixture under ordinary pressures are employed. The reaction temperature generally is within the range of 50° C. to 125° C.

As this invention is generally practiced the normally solid carbon monoxide/monoolefin polymer is mixed with the nitric acid containing small amounts of oxidation catalyst, e. g., vanadium pentoxide or a vanadium salt such as ammonium vanadate, and the mixture is heated at reflux temperature until evolution of oxides of nitrogen ceases. The reaction mixture thereafter is permitted to cool and the product which separates is removed, washed free of nitric acid with large quantities of water, and, if desired, treated with a reducing agent, e. g., stannous chloride and hydrochloric acid, to eliminate small quantities of nitro compounds which are formed in the oxidation. The resulting mixture of acids may be purified either by recrystallization or by conversion to the methyl esters and fractional distillation.

The examples which follow are submitted to illustrate and not to limit this invention. Unless otherwise specified, parts are by weight.

Example I

Twenty parts of a 1 to 1.6 carbon monoxide/ethylene polymer having an intrinsic viscosity of 0.5 (measured in metacresol at 25° C. at a concentration of 0.5 g./100 ml. of solution), 100 parts of 50% aqueous nitric acid, and 0.1 part of ammonium vanadate are mixed and heated under reflux for 3 hours. Excess nitric acid is removed from the reaction mixture by distillation with steam under slightly reduced pressure. The resulting residue is decolorized with charcoal and evaporated to dryness. The yield of solid product is 3 parts. The product is principally succinic acid, as shown by the melting point and neutral equivalent of a sample purified by recrystallization from a mixture of alcohol and benzene. Its melting point is 186 to 187° C. and its neutral equivalent is 61.

The carbon monoxide-ethylene polymer used in the above example is prepared as follows:

A pressure reactor is flushed with nitrogen, charged with 1 part of benzoyl peroxide and 100 parts of water, closed, evacuated, and pressured with ethylene to 450 atmospheres and thereafter with carbon monoxide to 500 atmospheres. The reaction mixture is heated to 100° C. for 12 hours while the pressure is kept at 850 to 1000 atmospheres by occasional repressuring with carbon monoxide. The reactor is cooled, bled of excess gases, and opened. The yield of polymer isolated by filtration and drying is 24 parts.

*Example II*

Twenty parts of a 1 to 4.9 carbon monoxide/ethylene polymer having an intrinsic viscosity of 0.3 (measured in chloroform at 25° C. at a concentration of 0.1 g./100 ml. of solution) and 140 parts of 70% aqueous nitric acid are warmed under reflux until an exothermic reaction starts. After the exothermic reaction subsides, the mixture is heated under reflux for 5 hours. The resultant mixture is cooled, and a layer of greasy reaction product containing the dibasic acids separates. This is dissolved in ether and the ether solution is extracted with a relatively large volume of water. The ether layer is separated, and, upon evaporation of the ether, yields 5.7 parts of a residue which has the consistency of a stiff grease. It is soluble in dilute aqueous sodium hydroxide, acetone, and warm benzene but is insoluble in water. The average molecular weight of this mixture of acids is 1100 as determined ebullioscopically in benzene.

The aqueous extract of the ether solution is evaporated to dryness. The residue is triturated with ether and the ether solution thus obtained is washed with water and evaporated to dryness. The residual viscose yellow liquid which amounts to 12.5 parts is soluble in dilute aqueous sodium hydroxide. This mixture of acids has an average molecular weight of 950 as determined ebullioscopically in benzene.

The polymer used in the above example is prepared as follows:

A pressure reactor is flushed with nitrogen, charged with 0.5 part of diethyl peroxide and 100 parts of benzene, closed, evacuated, and pressured to 350 atmospheres with a mixture of carbon monoxide and ethylene containing 10% carbon monoxide. The reaction mixture is heated to 130° C. and maintained at 128 to 131° C. for 16 hours, while the pressure is kept at 800 to 1000 atmospheres by occasional repressuring with the mixture of ethylene and carbon monoxide. The reactor is cooled, bled of excess gases, and opened. The yield of polymer dried by milling on hot rubber rolls is 76 parts.

*Example III*

Five parts of a 1 to 10.6 carbon monoxide/ethylene polymer having an intrinsic viscosity of 0.7 (determined in xylene at 85° C. at a concentration of 0.125 g./100 ml. of solution) and 56 parts of 70% aqueous nitric acid are heated together for 1.5 hours over a steam bath at a temperature of about 90° C. to 100° C. The solid product, which amounts to 5 parts, is separated, washed with water, and dissolved in hot benzene. Methanol is added to the solution and the 2.5 parts of solid product which separates on cooling is collected on a filter and dried. It has the consistency of a hard wax and melts at 106 to 110° C. It is a mixture of high molecular weight dicarboxylic acids as shown by the following data.

Per cent carbon_____ 79.52, 80.34, 80.00
Per cent hydrogen_____ 13.30, 12.99
Per cent nitrogen_____ 0.7
Neutral equivalent_____ 830
Average molecular weight (ebullioscopically in benzene)_____ 1480, 1430

The mixture of acids which are soluble in the cold benzene/methanol mixture is a greasy solid which is soluble in hot alcohol and in dilute aqueous sodium hydroxide. The average molecular weight of the mixture is 570 and its neutral equivalent is 512.

The polymer used in the above example is prepared as follows:

A pressure reactor is flushed with nitrogen, charged with 0.5 part of diethyl peroxide, closed, and pressured to 450 atmospheres with a mixture of carbon monoxide and ethylene containing 2% carbon monoxide. The reaction mixture is heated to 130° C. and maintained at 129 to 131° C. for 17 hours while the pressure is kept at 840 to 1000 atmospheres by occasional repressuring with the mixture of ethylene and carbon monoxide. The reactor is cooled, bled of excess gases, and opened. The yield of polymer is 65 parts.

The process described in the above examples is generally applicable to any polymer of carbon monoxide with a compound containing ethylenic unsaturation. These polymers, which contain ketonic carbonyl groups, are generally prepared by the method described in the copending application of M. M. Brubaker, S. N. 449,765, filed July 4, 1942, now abandoned. They may be obtained by polymerizing carbon monoxide with at least one monoolefin, that is, an aliphatic compound consisting solely of carbon and hydrogen and in which the sole carbon to carbon unsaturation is the group >C=C<. Examples of these polymerizable monoolefins are ethylene, propylene, the butylenes and the like. The polymers are made by subjecting the mixture of carbon monoxide and monoolefin to temperatures in excess of 20° C. in the presence of a peroxy compound catalyst under pressures in excess of atmospheric and preferably in the range of 200 and 3000 atms.

The polymers which may be used in the process of this invention may contain ethylene and carbon monoxide in mole ratios of from 1:1 to 100:1 or even higher. In general the molecular weight of the acids produced increases with an increase in the olefin/carbon monoxide ratio while the ease of oxidation increases with a decrease in the olefin/carbon monoxide ratio. Polymers suitable for use in the process of this invention may contain, in addition to carbon monoxide and one or more mono-olefins as polymer components, other polymerizable unsaturated compounds such as vinyl esters, acrylic and methacrylic acid derivatives, dienes, fumaric or maleic acid derivatives, etc. In such cases the acids obtained are of lower molecular weight or contain additional functional groups as the case may be.

The oxidation of the carbon monoxide/monoolefin polymer can be carried out over a wide range of conditions and methods of procedure. Thus, the carbon monoxide/monoolefin polymer may be added directly to the oxidizing solution at the desired temperature or, preferably, all of the reactants may be mixed at room temperature, and the reaction mixture subsequently heated to the temperature at which it is desired to effect the oxidation. The oxidation can be conducted effectively with nitric acid of concentrations ranging from about 25 to about 70% by weight, and at temperatures in the range of from about 50° C. to the boiling point of the oxidizing mixture under ordinary pressures. Catalysts such as ammonium vanadate and other vanadium salts, such as, sodium vanadate, and also vanadium oxides are preferably added to the oxidizing agent.

In practicing the invention, it is generally preferred to use nitric acid of from 25 to 70% concentration and an amount of ammonium vanadate or other vanadium salt catalyst ranging from about 0.15% to about 2% based upon the weight of the carbon monoxide/monoolefin polymer.

Generally, it is desirable to use more acid than is theoretically required to oxidize completely the carbon monoxide/monoolefin polymer. This is especially true if complete oxidation is desired. When the amount of oxidizing agent used is insufficient to oxidize the polymer completely or when the oxidation reaction is interrupted before it is complete, dicarboxylic acids containing ketonic carbonyl groups are obtained.

The mixtures of aliphatic alpha, omega-dicarboxylic acids produced by the process of this invention are useful in the synthesis of synthetic waxes, plasticizers, etc.

I claim:

1. A process for the production of alpha, omega-dicarboxylic acids which consists in treating, with an oxidizing agent comprising nitric acid of about 25 to 70% $HNO_3$ by weight, the normally solid polymers obtained by polymerization of carbon monoxide with ethylene, at a temperature of at least 50° C.

2. A process for the production of alpha, omega-dicarboxylic acids which consists in treating, with an oxidizing agent comprising nitric acid of about 25 to 70% $HNO_3$ by weight, the normally solid polymers obtained by polymerization of carbon monoxide with at least one monoolefine, at a temperature within the range of about 50° to 125° C.

3. A process for the production of alpha, omega-dicarboxylic acids which comprises heating a polymer prepared by polymerizing ethylene together with carbon monoxide, under reflux-boiling conditions with nitric acid of 25 to 75% concentration, in the presence of from about 0.15 to 2%, based on the weight of the said polymer, of a vanadium salt, and separating a mixture of dibasic acids from the resultant reaction product.

4. A process for the production of alpha, omega-dicarboxylic acids which comprises admixing about 5 parts of a carbon monoxide/ethylene polymer in which the molal ratio of combined carbon monoxide/ethylene is about 1:10.6, with about 56 parts of a 70% aqueous nitric acid solution, heating the mixture at a temperature of about 90° to 100° C. for 1.5 hours, separating the resultant solid oxidation product, dissolving the said oxidation product in benzene, adding methanol to the resultant solution, whereby a hard waxy mixture of dicarboxylic acids having a melting point of 106° to 110° C. is precipitated.

5. A process for the production of alpha, omega-dicarboxylic acids which comprises heating with aqueous nitric acid the normally solid polymers obtained by polymerization of carbon monoxide with ethylene, at a temperature of at least 50° C., continuing the oxidation whereby alpha, omega-dicarboxylic acids are produced, and thereafter separating the said acids from the resulting oxidation product.

6. A process for the production of alpha, omega-dicarboxylic acids which comprises heating with aqueous nitric acid and a catalytic quantity of a vanadium compound the normally solid polymers obtained by polymerization of carbon monoxide with ethylene, at a temperature of at least 50° C., continuing the resulting oxidation whereby alpha, omega-dicarboxylic acids are produced, and thereafter separating the said acids from the resulting oxidation product.

7. A process for the production of alpha, omega-dicarboxylic acids which comprises heating with an oxidizing agent consisting essentially of an aqueous solution of nitric acid, at a temperature within the range of 50° to 125° C., the normally solid polymers obtained by polymerization of carbon monoxide with ethylene, whereby alpha, omega-dicarboxylic acids are produced, and thereafter separating the said acids from the resulting oxidation product.

8. A process for the production of alpha, omega-dicarboxylic acids which comprises heating a polymer, prepared by polymerizing ethylene together with carbon monoxide, with an oxidizing agent of the class consisting of nitric acid, and molecular oxygen, at a temperature of at least 50° C., whereby oxidation of the carbon monoxide/ethylene polymer to dibasic acids takes place, and thereafter separating dibasic acid from the resulting product.

SAMUEL L. SCOTT.

REFERENCES CITED

The following references are of record in the file of this patent:

UNITED STATES PATENTS

| Number | Name | Date |
|---|---|---|
| 2,267,377 | Olin et al. | Dec. 23, 1941 |
| 2,360,673 | Hanford | Oct. 17, 1944 |